(12) United States Patent
Gleixner et al.

(10) Patent No.: US 10,045,679 B2
(45) Date of Patent: Aug. 14, 2018

(54) DISHWASHER HAVING AT LEAST TWO LUMINOUS SURFACE ELEMENTS

(71) Applicant: BSH Hausgeräte GmbH, Munich (DE)

(72) Inventors: Marco Gleixner, Bachhagel (DE); Franz Kiechle, Günzburg (DE); Karlheinz Rehm, Dischingen (DE)

(73) Assignee: BSH Hausgeräte GmbH, Munich (DE)

( * ) Notice: Subject to any disclaimer, the term of this patent is extended or adjusted under 35 U.S.C. 154(b) by 281 days.

(21) Appl. No.: 14/783,089

(22) PCT Filed: Apr. 10, 2014

(86) PCT No.: PCT/EP2014/057271
§ 371 (c)(1),
(2) Date: Oct. 8, 2015

(87) PCT Pub. No.: WO2014/170202
PCT Pub. Date: Oct. 23, 2014

(65) Prior Publication Data
US 2016/0045095 A1    Feb. 18, 2016

(30) Foreign Application Priority Data

Apr. 16, 2013 (DE) .................. 10 2013 206 865

(51) Int. Cl.
*A47L 15/42* (2006.01)
*F21V 33/00* (2006.01)
(Continued)

(52) U.S. Cl.
CPC ....... *A47L 15/4251* (2013.01); *A47L 15/4246* (2013.01); *F21V 33/0044* (2013.01);
(Continued)

(58) Field of Classification Search
CPC ............. A47L 15/4251; A47L 15/4246; A47L 15/4257; A47L 15/4265; F21V 33/0044; G02B 6/0095
See application file for complete search history.

(56) References Cited

U.S. PATENT DOCUMENTS 3,571,939 A    3/1971 Paul
3,915,180 A    10/1975 Jacobs
(Continued)

FOREIGN PATENT DOCUMENTS

CN    101301482 A    11/2008
DE    1051234 B    2/1959
(Continued)

OTHER PUBLICATIONS

Machine Translation of Fukushima, JP 11-346976, Dec. 1999. (Year: 1999).*

(Continued)

*Primary Examiner* — David G Cormier
(74) *Attorney, Agent, or Firm* — Michael E. Tschupp; Andre Pallapies; Brandon G. Braun

(57) ABSTRACT

A dishwasher includes a washing container having a plurality of walls and enclosing a washing chamber. At least one of the walls of the washing container has at least two apertures which are covered by planar lighting elements, respectively. The apertures are separated from one another by a reinforcing member, with the planar lighting elements having a total surface area that equals at least 20% of a wall surface area of the at least one wall.

14 Claims, 10 Drawing Sheets

(51) Int. Cl.
*F21V 8/00* (2006.01)
*F21W 131/30* (2006.01)

(52) U.S. Cl.
CPC ......... *G02B 6/004* (2013.01); *F21W 2131/30* (2013.01); *G02B 6/0095* (2013.01)

(56) References Cited

U.S. PATENT DOCUMENTS

| | | |
|---|---|---|
| 5,836,669 A | 11/1998 | Hed |
| 5,979,472 A | 11/1999 | Lowery |
| 6,059,420 A | 5/2000 | Rogers |
| 6,877,329 B2 | 4/2005 | Bassi |
| 6,908,204 B2 | 6/2005 | Kraft |
| 7,156,113 B2 | 1/2007 | Jerg |
| 7,215,390 B2 | 5/2007 | Moersch |
| 7,588,340 B2 | 9/2009 | Bauer et al. |
| 8,142,037 B2 | 3/2012 | Hering et al. |
| 8,567,976 B2 | 10/2013 | Hamlin et al. |
| 2004/0264168 A1 | 12/2004 | Gotz et al. |
| 2005/0073628 A1 | 4/2005 | Morsch |
| 2005/0083449 A1 | 4/2005 | Morsch |
| 2006/0049188 A1 | 3/2006 | Gramlich et al. |
| 2006/0201181 A1 | 9/2006 | Bauer et al. |
| 2008/0245788 A1 | 10/2008 | Choong |
| 2009/0126765 A1 | 5/2009 | Buehlmeyer |
| 2009/0129114 A1 | 5/2009 | Buesing et al. |
| 2009/0272136 A1 | 11/2009 | Knoell et al. |
| 2009/0301530 A1 | 12/2009 | Shin |
| 2010/0033949 A1 | 2/2010 | Hering |
| 2010/0207543 A1 | 8/2010 | Harwood |
| 2010/0218793 A1 | 9/2010 | Olesen et al. |
| 2011/0134627 A1 | 6/2011 | Hamlin et al. |
| 2012/0055513 A1 | 3/2012 | Eglmeier |
| 2014/0240959 A1 | 8/2014 | Ott et al. |
| 2016/0051123 A1 | 2/2016 | Gleixner et al. |

FOREIGN PATENT DOCUMENTS

| | | |
|---|---|---|
| DE | 10210842 A1 | 9/2003 |
| DE | 102007021298 A1 | 11/2008 |
| EP | 1507114 A1 | 2/2005 |
| EP | 1624101 A1 | 2/2006 |
| JP | H11346976 A | 12/1999 |

OTHER PUBLICATIONS

Report of Examination including National Search Report CN 2014800216165.
International Search Report PCT/EP2014/057271 dated Jun. 2, 2014.
Report of Examination DE 10 2013 206 865.4 dated Feb. 21, 2014.
National Search Report CN 2014800216165 dated Sep. 4, 2017.

* cited by examiner

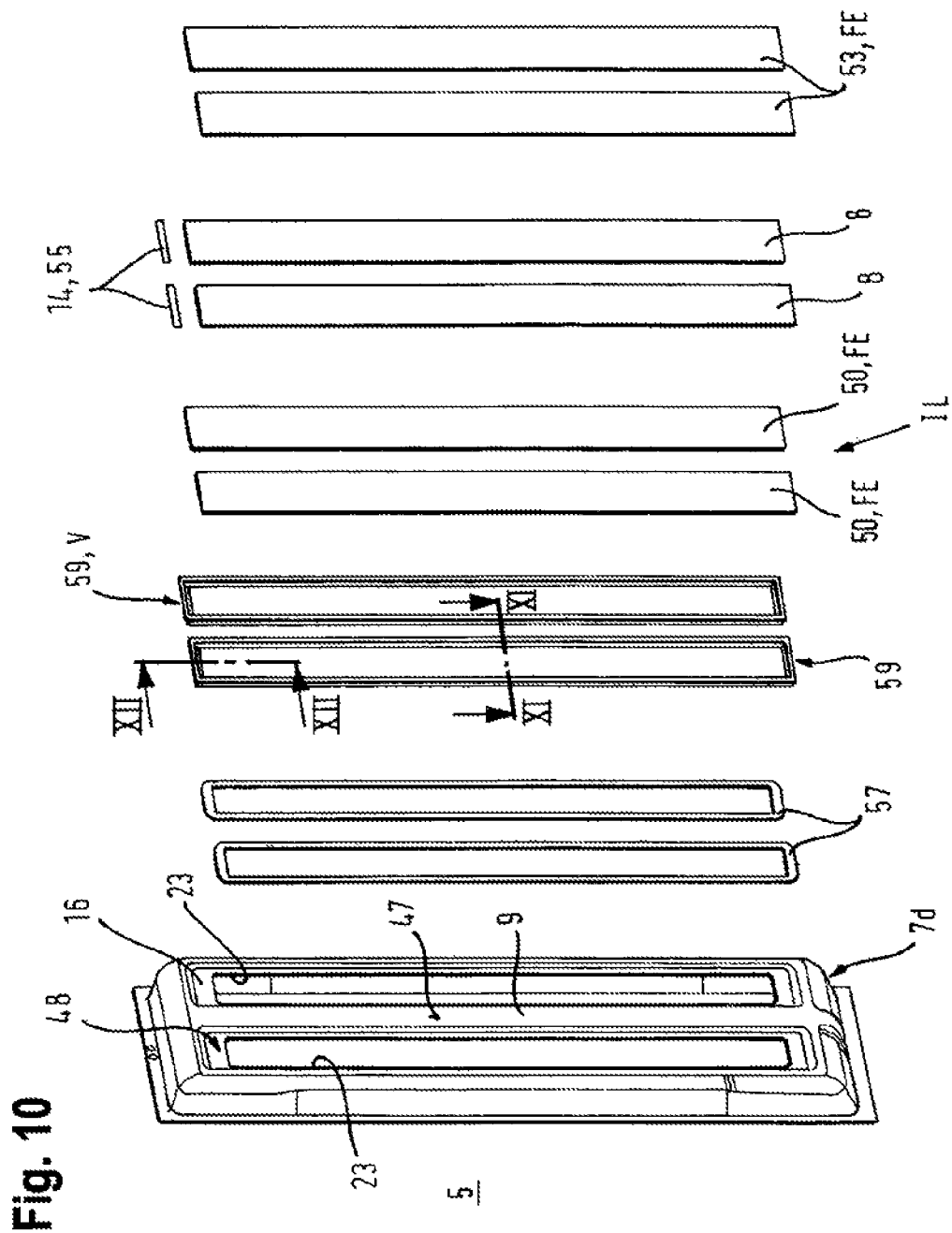

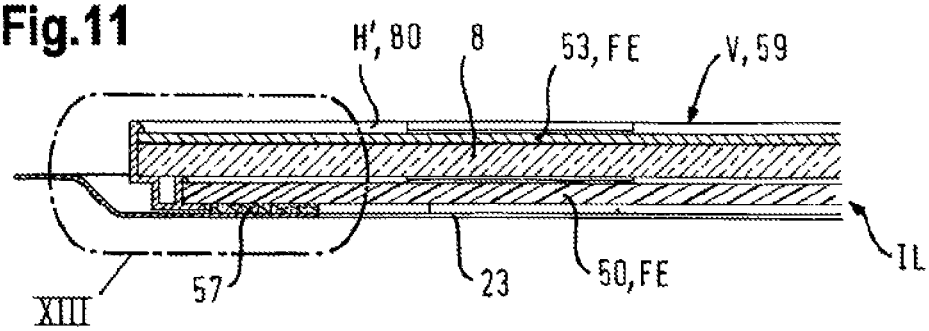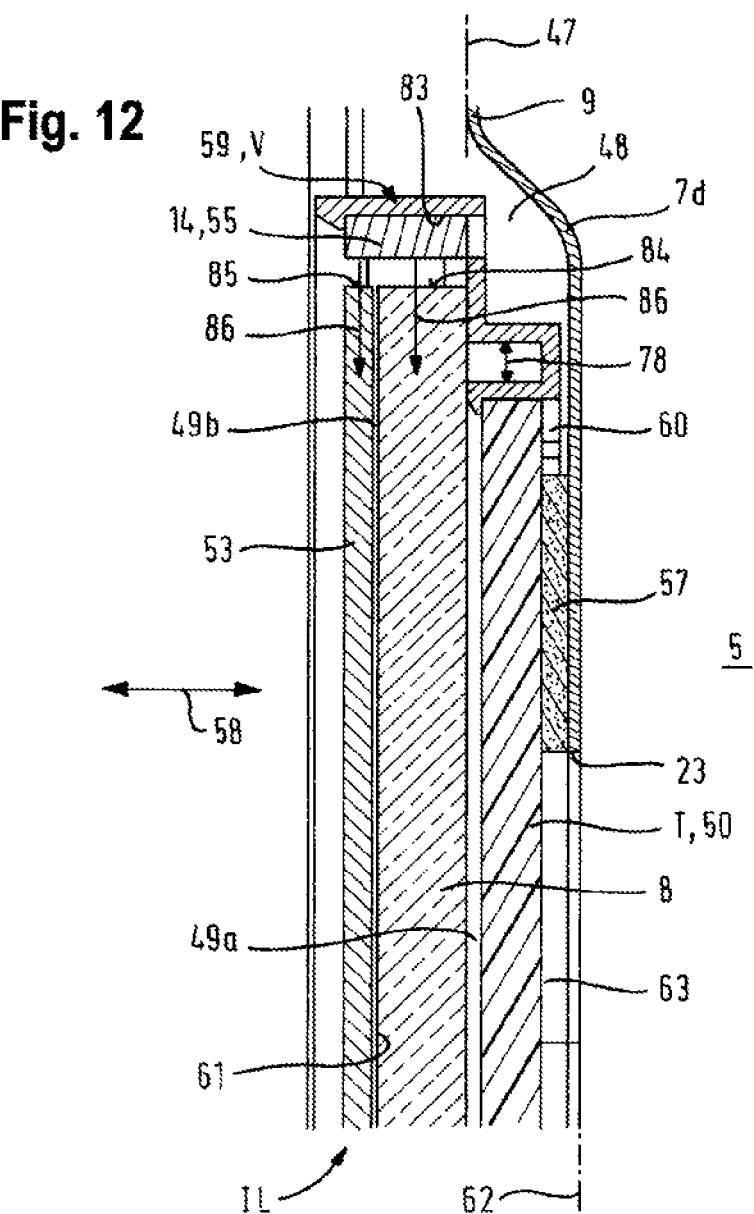

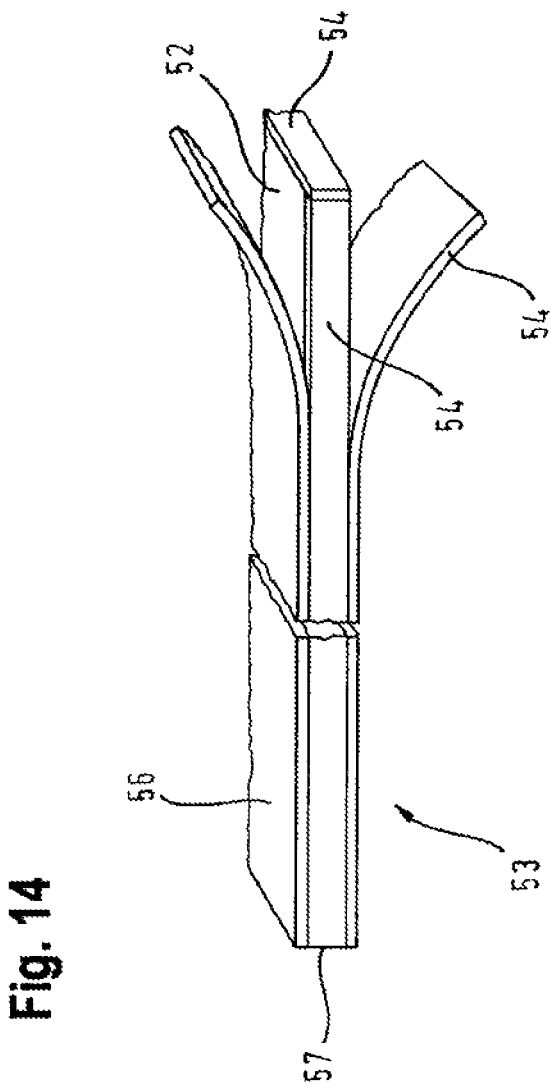

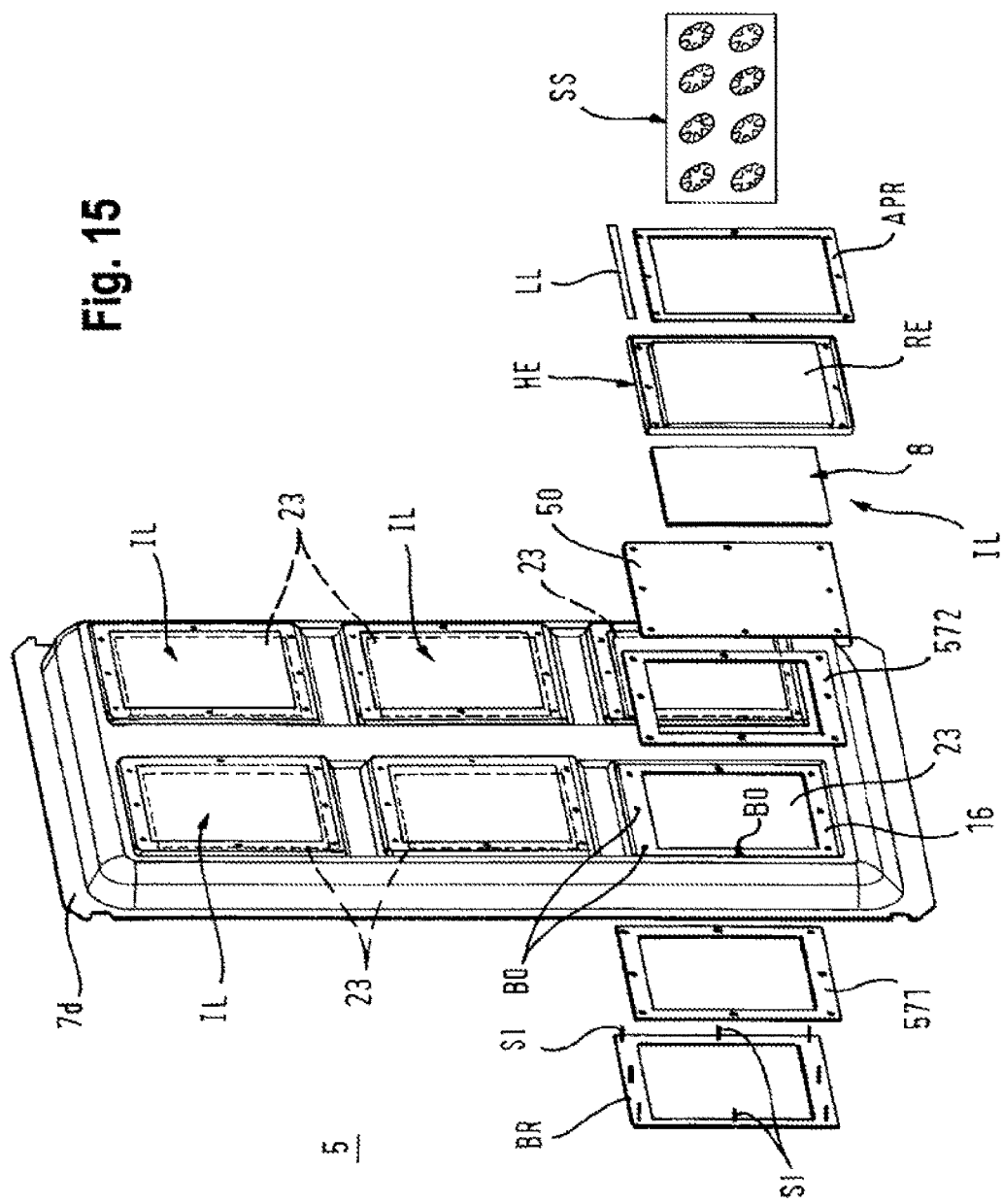

DISHWASHER HAVING AT LEAST TWO LUMINOUS SURFACE ELEMENTS

BACKGROUND OF THE INVENTION

The invention relates to a dishwasher having a washing chamber enclosed by a washing container, in which chamber washing items are cleaned preferably at a raised temperature and using washing liquid, preferably water, in particular mixed with chemicals such as e.g. detergent or rinse aid. In general, conditions that prevail in the washing chamber differ sometimes considerably from those in the normal environment as regards temperature, humidity etc. While the dishwasher is in washing operation, during which the loading window of its washing container is expediently closed by a door, washing liquid is sprayed into the washing chamber by one or more spray mechanisms, thereby wetting the washing chamber. One or more loading units such as e.g. dishware baskets and/or cutlery drawers, which are used to hold the washing items to be cleaned, are preferably accommodated in the washing chamber.

In order to improve the lighting conditions, an electrical light source is often provided in the washing chamber, which not only makes a protective barrier necessary against the conditions prevailing in the washing chamber but also requires one or more electrical power cables to be fed through a wall bounding the washing chamber. There is also the disadvantage that such light sources often cause an annoyance because they reduce the useful space of the washing chamber and achieve only insufficient illumination of the washing chamber. In addition, the light sources can often be positioned only in such a way that they dazzle the user when the user is loading or unloading the washing chamber.

BRIEF SUMMARY OF THE INVENTION

The object of the invention is to provide a dishwasher having improved lighting or illumination of its washing chamber.

This object is achieved as claimed by the invention in that at least one of the walls of the washing chamber, in particular the rear wall thereof, comprises at least two apertures, each covered or closed by a planar lighting element, and a reinforcing member separating the apertures from one another, and in that the planar lighting elements each have a total surface area that equals at least 20%, in particular between 50% and 95%, of the wall surface area.

This embodiment provides a large-area i.e. extensive illumination region which not only allows improved illumination of the washing chamber, in particular uniform illumination that is glare-free and casts less shadow, compared with a conventional point light source that is additionally mounted on a side wall of the washing chamber and protrudes into same, but also additionally or independently thereof facilitates a multiplicity of illumination effects, lighting designs or lighting arrangements. It also avoids the disruption, in particular reduction, to the given space available in the washing chamber, hitherto caused by the housing of a point light source mounted on a side wall of the washing chamber, which housing protrudes into the washing chamber.

In the context of the invention, the walls of the washing chamber include in particular also the internal wall of the door, which faces the washing chamber in its final closed position. This internal door can also be formed totally or in part as a planar lighting element based on the design principle according to the invention. Thus the washing chamber is the dishwasher treatment chamber, which becomes wet from washing liquid during washing operation and in which washing items to be cleaned can be accommodated for exposure to washing liquid. The washing chamber is enclosed by walls of the washing container and the internal wall, i.e. what is known as the interior door, of the door, preferably in a largely leak-proof manner, when the door closes the loading window of the washing container, in particular e.g. for washing operation of the dishwasher.

A wall can be designed almost entirely as a lighting region in the manner proposed, although the reinforcing member, which is preferably integral with the washing container or the wall, is always present between the two lighting elements and stiffens the wall region concerned or the washing container in the manner of a framework, so that any contribution to the rigidity of the washing container to be made by the, for instance slab-shaped, planar lighting elements can be reduced. In addition, when the wall is largely replaced by planar lighting elements, illumination of the washing chamber is provided by a simple structural design and without restricting the space available in the washing chamber. If the large-area lighting region in question is provided particularly preferably on the rear wall, then it can be used primarily to illuminate sufficiently the rear area of the washing chamber that lies furthest from the front door and hitherto lay mostly in darkness. This improves the ergonomics and convenience for a user of the domestic appliance.

The reinforcing member flanked by the lighting elements, in addition to its effect of increasing rigidity, has the advantage that it provides a mounting surface for functional elements provided inside the washing chamber. Thus a reinforcing member running vertically on the rear wall can be used, for example, for attaching one or more pipes for supplying water to a spray mechanism arranged on the top wall, in particular to a ceiling shower provided there or to a spray arm rotatably mounted there, and/or to a spray mechanism for optional fitting on the rear wall, in particular to a spray arm rotatably mounted there. The side of the reinforcing member that faces away from the washing chamber can likewise be used for fitting components, for instance likewise for fitting a supply pipe for a spray arm or for fitting hoses.

In other words and in more general terms, a dishwasher according to the invention comprises a washing chamber exposed to liquid during washing operation, which chamber is enclosed by a plurality of walls of a washing container and by the internal wall of a door. At least two apertures in at least one of the walls, in particular in the rear wall, of the washing container, are each covered or closed by at least one illumination element, which comprises at least one planar lighting element and at least one transparent, translucent or reflective planar element associated therewith.

In principle a planar lighting element can be designed such that it performs additional functions to its lighting function, for example it increases the stiffness and mechanical strength of the wall concerned, is resistant to the conditions prevailing in the washing chamber during the cleaning or washing operation, or has reflective properties in order to be able to use for illuminating the washing chamber as much as possible of the light coupled into or generated by a planar lighting element. Such a multipurpose capability, however, can often only be achieved using non-standard and hence expensive special designs. The invention here takes the approach of using at least one separate transparent, translucent or reflective planar element to implement the type of functions mentioned above, i.e. to decouple these functions from the planar lighting elements. It is thereby possible to select each planar lighting element solely on the basis of its optical properties, while functions such as stiffening the wall comprising the planar lighting element, for instance, need not be taken into account. Thus, for instance, the wall can be reinforced by a front panel arranged on the side of the planar lighting element that faces the washing container, as is explained later below.

In particular, in a generalization of the above specific design, it can be expedient if the wall concerned comprises more than two apertures, each of which are covered or closed by a planar lighting element. One reinforcing member for the wall is then provided between every two adjacent apertures. It can be advantageous for instance, if, viewed along the width of the wall, there is provided a row of at least two apertures having associated illumination elements covering or closing said apertures, and/or if, viewed along the height of the wall, there is provided a row of at least two apertures having associated illumination elements covering or closing said apertures. This facilitates a wall illumination panel which is composed of a multiplicity of apertures having lighting elements covering or closing said apertures. Thanks to the reinforcing members left between every two apertures, the wall has sufficient rigidity and inherent stiffness. Thus a lighting panel in a wall can be formed, for instance by providing side by side along the width of the wall two rows each containing three apertures arranged one above the other, each aperture being covered or closed by a lighting element, i.e. the wall comprises a total of six apertures each having associated lighting element.

There are various possible designs for fixing the planar lighting elements to a wall and for the embodiment of the wall itself. It is preferably provided that the planar lighting elements are each fixed indirectly or directly to an edge of a wall, which edge encloses the apertures and forms a fixing flange. This can be manufactured easily by using a punching process to produce the wall apertures in a washing container initially fabricated with closed walls. The areas of the wall left behind then form the reinforcing member and the fixing flange.

By virtue of the planar lighting element overlapping the edge or the fixing flange, it is easy to produce a mechanically good-quality and/or leak-proof connection between the planar lighting element in the aperture of the wall concerned or in the gap between adjacent walls. It is advantageous in particular that the planar lighting element can be fitted from the outside of the washing container, so that fixing and/or sealing means remain invisible in the washing chamber and do not intrude. In particular this largely avoids direct exposure of the fixing and/or sealing means to chemicals in the washing chamber such as e.g. a cleaning solution, which otherwise might result in damage to said means. This guarantees that the construction will last.

According to an advantageous development of the invention, the stiffness or rigidity of the wall or of the washing container can be increased still further by means of the fixing flange running in a plane that is offset in a transverse, in particular normal, direction to the wall with respect to the wall plane or with respect to wall regions enclosing the fixing flange. In other words, an edge region of the wall containing the fixing flange is expediently bent away from the washing chamber or towards the washing chamber such that a step is produced, i.e. the edge region is in the form of an angle section, of which the endmost side, which encloses the aperture, is the fixing flange, and the other side extends in a substantially transverse direction to the wall. The wall regions and the reinforcing member are hence no longer mere flat sheet-metal parts but are profiled, which increases their rigidity and torsional stiffness. This embodiment increases the rigidity of the wall regions through which the apertures are made and the rigidity of the reinforcing member.

Said fixing-flange offset, in particular in the direction towards the washing chamber, has the additional advantage that it forms, in particular on the outside, a depression or recess in the wall regions enclosing the aperture, which can accommodate a planar lighting element and, if applicable, further components such as the planar elements, i.e. panels and films, covering the aperture and used for instance for protecting the planar lighting element.

The planar lighting elements expediently replace i.e. substitute at least 50%, in particular at least 75%, preferably between 80% and 95%, of the total surface area of at least one wall bounding the washing chamber. This bounding wall, which is entirely or largely replaced, can thereby form per se a large-area, extensive lighting object that illuminates. It is brighter than the other walls of the washing chamber that are not replaced by a planar lighting element. In particular this allows a multiplicity of interesting potential lighting arrangements. In addition or independently thereof, compared with only a point light source it is possible to illuminate larger spatial areas than before in the washing chamber in an optimum, in particular homogeneous, manner.

The planar lighting element is expediently formed by a slab-shaped or panel-like element. This means that it can be produced as a component with a simple design, which is advantageous in the mass production of dishwashers. In addition, it makes it easy to assemble with other wall pieces into a washing container. Thus, for example, a washing container for a dishwasher, which container comprises a, for instance rectangular, front loading window or stacking window, can be assembled easily from two side wall panels, a top wall panel, a base wall panel and a planar lighting element as the rear wall panel. The slab-shaped or panel-like geometrical shape of the planar lighting element also allows it to be easily manufacturable from a glass material and/or plastics material.

In particular it can be expedient if the planar lighting element is designed to have a largely flat, in particular smooth, surface at least on its inner wall surface that faces the washing chamber. This reduces or largely prevents the adherence of dirt particles on the planar lighting element compared with the case when the planar lighting element does not have a flat, in particular smooth, surface, i.e. the planar lighting element stays largely clean. It also means that the planar lighting element can be cleaned easily should it actually become dirty. This flat-surfaced, in particular smooth-surfaced, design of the planar lighting element is particularly advantageous for a dishwasher if at least one wall such as e.g. the rear wall of the washing container is replaced by a planar lighting element according to the invention. Dirt particles such as e.g. food residues that are removed from items to be cleaned such as e.g. dishware and/or cutlery in the washing container when sprayed with washing liquid by one or more spray mechanisms hence adhere far less or hardly at all to the planar lighting element.

It can also be advantageous if at least one sealing means is provided in a joint between the planar lighting element and the edge or fixing flange enclosing the aperture. This can ensure an adequate seal for the washing chamber.

According to an advantageous development of the invention, the planar lighting element is designed to guide and/or emit light such that a backlight is provided, in particular a backlight that is largely homogeneous. This allows in particular largely glare-free illumination and/or an attractive lighting design for the washing chamber in a variety of circumstances. For instance, the rear wall of a washing container can be formed by a planar lighting element embodied as a backlight. It is thereby possible to illuminate ready-cleaned washing items from behind i.e. from that side of the washing-chamber interior furthest from the loading window of the washing container, and in particular to make the degree of cleanliness of said items more visible to a user who opens the front door of the dishwasher after a dishwashing program has finished running and looks into the interior of the washing container.

According to another advantageous development of the invention, the planar lighting element is designed to guide and/or emit light such that one or more light beams from at least one light source arranged outside the washing chamber can be coupled into the planar lighting element at at least one coupling-in point, one or more coupled-in light beams in the planar lighting element can propagate away from their respective coupling-in points in a direction of propagation parallel to the inner wall surface of the planar lighting element that faces the washing chamber, and such that of the one or more light beams propagating in this way, one or more light beams can be coupled out of the inner wall surface of the planar lighting element that faces the washing chamber, in particular at right angles to their direction of propagation, into the washing chamber at one or more coupling-out points that differ from the respective coupling-in points, although the planar lighting element is designed to be largely opaque viewed from the washing chamber. Hence the light can be emitted in a largely diffuse manner into the washing chamber, thereby largely preventing the dishwasher user from being dazzled when looking into the washing chamber. Since, viewed from the washing chamber, the outside of the planar lighting element does not show through to the inside, components and parts of the domestic appliance such as e.g. a light source can readily be positioned there.

In order to allow the planar lighting element to illuminate inwards into the washing chamber, the light source is expediently designed and arranged such that light rays that it emits impinge on the outer wall surface of the planar lighting element that faces away from the washing chamber at one or more points and/or impinge on at least one end face of the planar lighting element. It can be advantageous in this case if at least one optical transmission element, in particular at least one light waveguide, is optically coupled at one end to the light source and at the other end to the planar lighting element. This allows the light source to be located in the domestic appliance in a different position from the actual coupling-in point concerned. Hence in a dishwasher the light source can be placed, for example, in a floor assembly beneath the washing container, and light rays emitted by said light source are conveyed via at least one light waveguide to one or more coupling-in points on the outer wall or end face of the planar lighting element.

It is particularly advantageous if the planar lighting element is designed as a large-area light guide i.e. a light guide that extends over a two-dimensional plane. This allows the planar lighting element to illuminate uniformly in an improved manner, because light can be coupled out at a multiplicity of coupling-out points, which are evenly distributed over the inner wall surface of the planar lighting element.

In general terms, the planar lighting element is preferably designed such that it can emit light rays into the washing chamber in a diffuse manner. The planar lighting element expediently comprises extractors for this purpose. Hence the material layer of the planar lighting element can be mixed, for instance, with scattering and/or reflective particles, in particular pigment particles. At least the inner wall surface of the planar lighting element that faces the washing chamber can thereby be designed largely to block the view, in particular to appear opaque, when viewed from outside in particular from the washing chamber.

It may be advantageous to provide at least the inner wall surface of the planar lighting element that faces the washing chamber with at least one patterned layer or particle layer, in particular a colored layer, that transmits light from the internal layer of the planar lighting element to the outside, and appears largely to block the view, in particular appears opaque, when viewed from outside, in particular from the washing chamber. The planar lighting element can hence be produced advantageously. It can perform a lighting function while also performing the function of a conventional wall of the washing chamber, which is non-transparent. Thus it can even be sufficient to have a plastic panel or glass panel or a composite panel made of these materials, which is coated on its inner wall surface that faces the washing chamber with at least one colored layer or other patterned layer or particle layer.

In particular it can be advantageous if the planar lighting element is provided, at least on its inner wall surface, with at least one outermost translucent protective layer. It is thereby largely resistant to treatment materials used in the washing chamber.

In addition, it may be advantageous if the planar lighting element is designed to be electroluminescent or photoluminescent. In order to stimulate an electroluminescent planar lighting element to illuminate, it is preferably connected to a voltage source, which is arranged in particular outside the washing chamber, such as e.g. in a floor assembly below the washing chamber. Furthermore, an array of organic light emitting diodes such as e.g. OLEDs, or of inorganic light emitting diodes such as e.g. LEDs, may also be provided, which are each arranged as surface-emitting diodes. When using a photoluminescent planar lighting element, for adequate illumination from the planar lighting element it can be sufficient if light e.g. from a light source such as e.g. LEDs mounted at the front in the region of the loading window of the washing chamber is incident on the planar lighting element. It may be the case that light from an external light source or ambient light is already sufficient, which light shines into the washing chamber of the domestic appliance on opening the appliance front door and is incident on the photoluminescent surface of the planar lighting element.

By virtue of the planar lighting elements according to the invention, the interior or washing chamber of the washing container can be designed to be brighter over a large area than hitherto with merely point-source illumination. This is particularly advantageous if the washing container is stacked with washing items such as e.g. dishware and/or cutlery in one or more loading units such as e.g. dishware baskets and/or cutlery drawers, and hence on opening the front door its interior remains severely shadowed by the washing items and the dishware baskets from the external ambient light such as e.g. the kitchen light.

To summarize, the dishwasher comprises a washing chamber having two light-guiding and/or light-emitting planar lighting elements, which replace at least 20%, in particular between 50% and 95%, of a wall of the washing chamber and which are separated from one another by a reinforcing member. The wall concerned of the washing container thus has a framework design which both increases the stiffness and mechanical strength of the wall and provides the facility to use the reinforcing member for fixing functional elements. The dishwasher can be provided with at least one light source arranged outside the washing chamber for the purpose of coupling light into the planar lighting elements. These have a dual function since they have both the function of being construction elements, namely forming a wall or a portion thereof that bounds the washing chamber and the function of emitting into the washing chamber light coupled into these elements. The internal geometry of the washing chamber and the useful capacity thereof hence remain substantially unchanged, and there is no need for relatively large structural modifications to the washing chamber or washing container required by a conventional light source located therein, for instance cable feed-throughs in a wall or the redesign of existing components in the washing chamber such as baskets to hold washing items and that are moveably guided in the washing container. Instead, the light source is located outside the washing chamber, e.g. on the outside of the relevant wall, at least a portion of which is replaced by the planar lighting elements. In all the cases and embodiments mentioned, the planar lighting elements replacing the wall or a portion of the wall emit at least some of the coupled-in light into the washing chamber, and illuminate or light up same. The light source can be arranged in this case in particular such that the light which it emits is incident on the outer face facing away from the washing chamber and/or on at least one end face or end edge of the translucent wall or of the translucent portion.

Often in dishwashers, the space around the washing chamber is limited and therefore problems of space arise when positioning one or more light sources in this region. In an expedient embodiment variant, these problems are avoided by an optical transmission element, which preferably comprises at least one light guide, for example an optical fiber, which is optically coupled to the light source at one end and to the planar lighting element at the other end. The light source can then be arranged in a region of the dishwasher that has sufficient space available, for instance in a region beneath the washing container. One or even more transmission elements, by virtue of the small amount of space that they occupy, can be arranged even in narrow gaps, for instance between the washing container and an outer wall of the dishwasher.

The visual appearance of the washing chamber in its illuminated state can easily be altered or adapted to suit the given design requirements by the planar lighting element being colored. Such coloring can be effected by using colored material, for instance colored glass or plastics. Another option is to provide the outer face and/or inner face of the planar lighting elements with a translucent colored layer, in particular a plastics film. Another variant of a colored design is to use a luminescent, in particular fluorescent, material for a planar lighting element. In this case, the material contains luminescent substances, which preferably are embedded in the material of the planar lighting element or are finely distributed therein or dissolved therein. The light, which is coupled into such a planar lighting element by a light source arranged outside the washing chamber, is in this case converted at least partially into luminescence light, which is colored according to the type of luminescent pigment or dyestuff used.

In another preferred embodiment, the planar lighting elements are in the form of light guides. Light coupled in at a point is in this case transmitted inside the planar lighting element and distributed over the entire volume of said element or at least a part thereof. Such an embodiment is particularly advantageous in combination with a luminescent material. Materials of this type that are designed both to be luminescent and to act as a light guide are known as light-collecting plastics (LISA plastics), and usually contain fluorescent pigments.

Not every light-guiding and/or light-emitting material suitable for a planar lighting element will also withstand the conditions in a washing chamber. In this case, a solution can be found by providing an internal protective layer that transmits light from the inside of the planar lighting element towards the washing chamber, for instance a protective layer in the form of a coating or a film, which protects the planar lighting element primarily from moisture, corrosive chemical effects and also from excessive temperatures.

In a preferred embodiment variant of the dishwasher, in addition to the planar lighting element covering the corresponding aperture in the wall, are also provided one or more transparent, translucent or reflective planar elements, for instance in the form of films, panels or panes, which are arranged on at least one side of the planar lighting element and, like said lighting element, cover the aperture and act, for instance, as a color filter or as a protective barrier for the planar lighting element against the chemical and physical conditions prevailing in the washing chamber. The planar lighting element and one or more planar elements are positioned relative to one another such that they are each separated or spaced apart from one another in a transverse direction to the wall by an air gap having a gap width of more than 1 µm. This embodiment achieves two effects. First, the absence of planar contact between said elements prevents the formation of what are known as Newton rings. Newton rings are light/dark zones or color rings produced by interference between two overlapping, reflective, practically parallel surfaces. This would impair the visual appearance of the lighting region formed by the planar lighting element and mar the entire lighting situation. This phenomenon is reliably eliminated if the air gap has a gap width that is greater than 1 µm. Interference of the type mentioned only occurs if the gap width lies in the region of half the wavelength of visible light (approx. 780 nm or 0.78 µm max.). Second, the air gap can contribute to the thermal insulation of the washing chamber. For this purpose it is expedient to choose a larger gap width than would be necessary to avoid the Newton rings in order to increase the insulating effect of the air present in the air gap. Given the scarce amount of space available in a dishwasher, however, and with regard to preventing air convection in the air gap, which would again reduce the insulating effect, limits are set here. Thus preferably the gap width of the air gap is limited to 2 cm maximum.

Obviously there are a large variety of possible options for fixing a planar lighting element and other planar elements to a wall of the washing container. In a preferred embodiment variant, however, the planar lighting element and/or a planar element associated with the lighting planar element and covering the aperture is fixed to the fixing flange in such a way as to accommodate a relative movement between the planar lighting element or planar element and the fixing flange, which movement runs parallel to the plane spanned by the fixing flange and is caused by different thermal expansions of a washing-container wall, for instance made of steel, and an element of said type, for example made of plastic. Thanks to this embodiment of the fixing mechanism, materials for planar lighting elements and planar elements can be used that have a very different thermal expansion from that of the washing-container material. Different thermal expansions of fixing flange and a planar element and/or lighting element held thereon cannot have a weakening effect, at least in the long term, on the fixing mechanism.

In a particularly preferred embodiment variant, for said type of fixing mechanism, the planar lighting element or the planar element is adhesively bonded to the fixing flange 16 with the interposition of an elastic corrective layer 57 that absorbs shear forces caused by the relative movement between planar lighting element/planar element and fixing flange. The corrective layer here performs a dual function by providing an adhesive bond and also correcting for shear forces. The latter function is largely achieved when a corrective layer is used that is made at least in part, preferably entirely, from a plastics foam material, in particular a polyolefin foam. There is sufficient correction of shear forces when the corrective layer has a thickness of 0.2 mm to 2 mm, in particular 0.4 mm to 1 mm.

As has already been explained above, the reinforcing member separating every two apertures is used amongst other purposes for increasing the mechanical rigidity of the washing container. This aspect is improved further in another preferred embodiment variant of the dishwasher by fastening as the planar element a front panel, which is made of a transparent or translucent material and covers the aperture, to the fixing flange, wherein on the side of said panel that faces away from the washing chamber is arranged a planar lighting element, if applicable with the interposition of another element, for instance a planar element. This embodiment achieves several advantages. One advantage is that the planar lighting element can be selected without regard to any mechanical properties, different thermal expansion with respect to the fixing flange or the washing container or incompatibility with the chemical and physical conditions that prevail in the washing chamber during operation. The selection can be focused solely on the optical properties of the lighting element, for instance on achieving a lighting effect that is as uniform and efficient as possible. As regards the chemical compatibility of the front panel, it is expedient if it least a surface layer of the front panel that faces the washing chamber is made of a material that is resistant to the chemicals used in the washing chamber during operation of the dishwasher.

Another advantage of the front panel is in particular that, in addition to the reinforcing member mentioned in the introduction, it further increases the mechanical rigidity, in particular with regard to deformation of the washing container, by being made from a material that has suitable rigidity and torsional stiffness, for example from a polyamide or polyacrylate.

The fixing of a planar lighting element or another planar element to a fixing flange in a manner that absorbs shear forces as described above is developed particularly advantageously in that a planar lighting element or a planar element, for example the above-described front panel, which is connected to the fixing flange forms a carrier on which is fixed a planar lighting element or a planar element without said element being connected to the wall of the washing container. The element, for instance the front panel, connected to the fixing flange via a corrective layer for example, carries all the other elements in a piggyback fashion so to speak. Since the elements are not mechanically fixed to the washing-container wall, different thermal expansions of the elements and of the washing-container wall or of the fixing flange are practically irrelevant.

One option for providing said piggyback fixing mechanism is to fix a planar lighting element or a planar element on the carrier using a connecting element that is connected to the carrier in a form-fit that operates along the transverse direction to the wall. In a fixing mechanism of this type there is no need either to use screws or rivets or for adhesives. Provision is made simply for the connecting element to engage behind a surface of the front panel that faces the washing container. Easy assembly is achieved here especially when said form-fit is made via a snap-fit connection in a joining direction that is transverse to the wall. The connecting element can here be conveniently fitted with all the elements required and then the resultant entity is adhesively bonded to the fixing flange for instance using the above-mentioned corrective layer. It is advantageous in particular with regard to said pre-populating of the connecting element if the connection between the planar lighting element and, if applicable, other planar elements, is likewise made by means of a form-fit that operates in the transverse direction to the wall and in particular is designed as a snap-fit connection.

In another preferred embodiment variant of the dishwasher, the connecting element is preferably designed as a frame which encloses the carrier, i.e. for example the above-mentioned front panel, and the planar lighting element, effectively like a picture frame encloses a picture. In addition to producing a form-fit operating in the transverse direction to the wall, this embodiment of the connecting element also fixes the element that it is holding in a plane that lies parallel to the plane spanned by the fixing flange without any additional fixing elements being needed to do this.

For the purpose of the form fit connection with the front panel in the transverse direction to the wall, the frame expediently comprises at least one clasp element, which engages behind that side of the front panel that faces the washing chamber.

In another preferred embodiment variant of the dishwasher, a reflector film that reflects light and/or thermal radiation is arranged on the back face of the planar lighting element, i.e. the outer face of the planar lighting element that faces away from the washing chamber, which element covers the aperture in a washing-container wall from the outside of the wall. This expedient embodiment makes the lighting region provided by a planar lighting element appear brighter because of the reflection. The light output of the planar lighting element is thereby increased so that, if required, planar lighting elements that have a lower illumination level can be used. In order to prevent the formation of Newton rings, as explained above, in the joint between the planar lighting element or another planar element and the reflective layer, the respective elements are separated from one another by an air gap having a gap width of at least 1 μm.

The reflector film ensures that light exiting the planar lighting element via the outer face thereof that faces away from the washing container is not lost but is reflected. It has been found surprisingly that the lighting effect of the planar lighting element can be improved considerably if a light source is provided that is arranged such that light emanating therefrom is coupled into an end face of the reflector film. It is particularly advantageous here if a light source that exists for end-coupling of light into a planar light element, for instance a light source such as an LED strip, is used. In this case, the light source is positioned and oriented so that it is used jointly for end-coupling of light into the planar lighting element and into the reflector film.

To summarize, the invention relates to a dishwasher comprising a washing chamber which is exposed to liquid during washing operation and thereby gets wet, and which is enclosed by a plurality of walls of a washing container and by the internal wall of a door. Two or more apertures in at least one of the walls, in particular in the rear wall, of the washing container, are each covered or closed by at least one illumination element. Each of these illumination elements comprises at least one planar lighting element and at least one transparent, translucent or reflective planar element associated therewith.

Preferably at least one of the walls, in particular the rear wall, of the washing container contains at least two apertures, each covered by a planar lighting element, and the planar lighting element is associated with at least one separate transparent, translucent or reflective planar element covering the aperture. Each planar lighting element and planar element associated therewith are expediently separated from one another in the transverse direction to the wall, i.e. viewed along the normal to the wall, by an air gap. The illumination element, in particular the planar lighting element and/or the planar element of said illumination element, is fixed indirectly or directly advantageously e.g. by an adhesive bond and/or mechanical fastening in particular to an edge of the wall that encloses the aperture and forms a fixing flange. The plurality of illumination elements, in particular the plurality of planar lighting elements thereof, with which there may be associated one or more planar elements, replace in total preferably at least 50%, in particular at least 75%, preferably between 80% and 95%, of the total surface area of the wall concerned. In particular it is expedient if the illumination element, in particular the planar lighting element thereof and/or the planar element thereof associated with the planar lighting element, is fixed to the wall, in particular to the fixing flange thereof, in such a way as to accommodate a relative movement between the illumination element, in particular the planar lighting element thereof or the planar element thereof, and the wall, in particular the fixing flange thereof, which movement is caused by different thermal expansions and runs parallel to the plane spanned by the wall, in particular by the fixing flange thereof. The illumination element, in particular the planar lighting element thereof and/or the planar element thereof, is adhesively bonded to the wall, in particular to the fixing flange thereof, expediently with the interposition of an elastic corrective layer, in particular a sealant layer, that absorbs shear forces caused by the relative movement. In particular it can be advantageous if a front panel, which is made of a transparent or translucent material and covers the aperture, is mounted, in particular fastened, as the planar element to the wall, in particular to the fixing flange thereof that encloses the aperture concerned, wherein on the side of said panel that faces away from the washing chamber is arranged the planar lighting element, in particular spaced apart from said front panel by an air gap. It can be advantageous if a retaining element holding the planar lighting element and/or the corresponding planar element is provided, in particular a frame surrounding the outside of the planar lighting element and/or of the corresponding planar element. The retaining element together with the held planar lighting element and the planar element associated therewith then form the illumination element. For optimum illumination of the wall inside the washing chamber, it can be advantageous if a reflector film that reflects light and/or thermal radiation and covers the aperture, is arranged as a planar element on the side of the planar lighting element that faces away from the washing chamber. This reflective planar element is here expediently spaced apart from the planar lighting element by a defined air gap. A light source is expediently provided that is arranged such that light emanating therefrom is coupled into an end face of the reflector film. Additionally or independently thereof, the light source is expediently arranged such that light emanating therefrom is coupled into an end face of the planar lighting element. The illumination element is advantageously mounted on the outer face of the wall concerned that faces away from the washing chamber in such a manner that it covers from behind the aperture concerned in said wall. This leaves the washing chamber largely unaffected by the components of the illumination element concerned, in particular with regard to the amount of space originally available (with respect to no wall lighting). The layered arrangement of the washing-chemicals resistant front panel, the planar lighting element offset at a defined gap therefrom and the reflective planar element offset from said element by a defined gap (viewed from inside outwards) results in a planar sandwich construction of the illumination element, which can therefore be mounted on the outside of the wall concerned, in particular the rear wall, despite the small space available, in such a way that it does not protrude inadmissably beyond the specified dimensions of the dishwasher.

It can be particularly expedient if, viewed along the width of the wall, is provided a row of at least two apertures having associated illumination elements covering or closing said apertures, and/or if, viewed along the height of the wall, is provided a row of at least two apertures having associated illumination elements covering or closing said apertures. By virtue of the cross-members left between the individual apertures in the wall to be illuminated, the wall to be illuminated remains overall largely sufficiently stiff or rigid.

The advantageous embodiments and developments of the invention described above and/or in the dependent claims can be applied individually or in any combination, except, for instance, in cases where dependencies are explicit or alternatives cannot be combined. In particular, the embodiments that are directed to planar lighting elements, planar elements and their fixing to the washing container do not depend on the number of said parts that are present on a washing-container wall.

BRIEF DESCRIPTION OF THE DRAWINGS

The invention and advantageous embodiments and developments thereof are described below in greater detail with reference to drawings, in which, in each case in a schematic diagram:

FIG. 10 is an exploded perspective diagram that illustrates another option for fastening a planar lighting element to a wall, in which a frame is used to fasten said element to a wall of the washing chamber;

FIG. 11 is a partial section of a frame along line XI-XI in FIG. 10, where this frame is arranged together with a planar lighting element and two planar elements serving other purposes on the rear wall of the washing container;

FIG. 12 is a partial section along line XII-XII in FIG. 10;

FIG. 14 is a perspective partial view of a reflector film; and

FIG. 15 is a perspective schematic diagram of another advantageous exemplary embodiment of an illuminated wall, in particular the rear wall of the washing container of the dishwasher of FIG. 1, and viewed from outside, with the individual components of a lighting panel of the wall being depicted additionally in an exploded view.

DETAILED DESCRIPTION OF EXEMPLARY EMBODIMENTS OF THE PRESENT INVENTION

In FIGS. 1 to 15, corresponding parts are denoted by the same reference signs. Only those components of a dishwasher are described and denoted by reference signs that are necessary to the understanding of the invention. Of course the dishwasher according to the invention can comprise further parts and assemblies.

Figure 1:
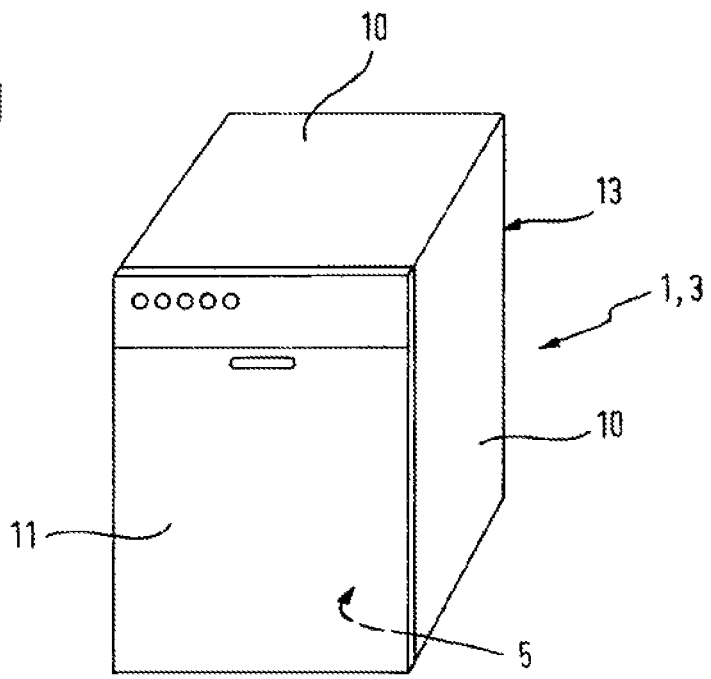
FIG. 1 is a perspective view of an advantageous exemplary embodiment of a dishwasher designed according to the invention.
Figure 2:
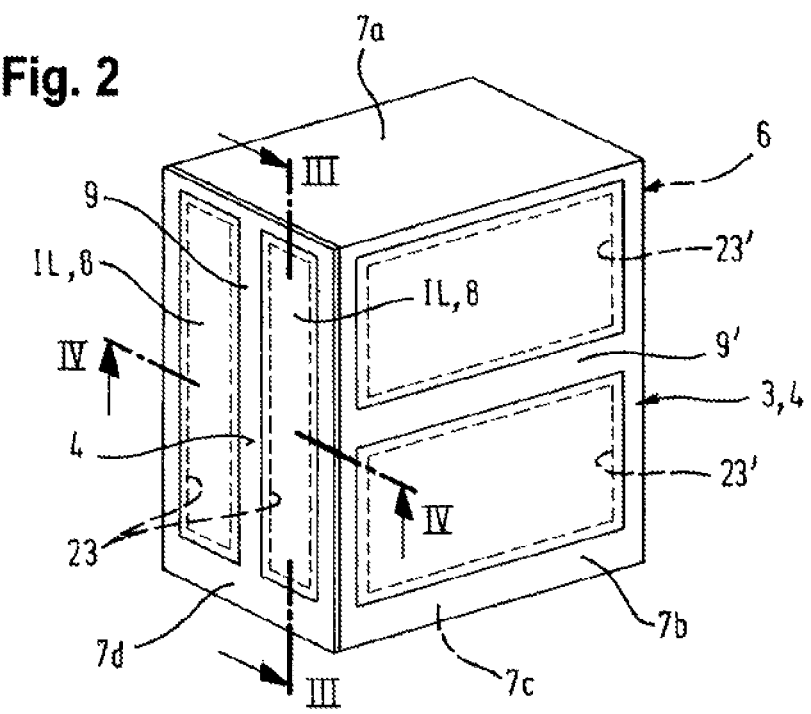
FIG. 2 is a perspective view from the rear of a washing container of the dishwasher shown in FIG. 1.

FIG. 1 shows schematically in a slight perspective view a dishwasher 1 having a washing container 3, in which dishwasher there is a washing chamber 5 enclosed by the washing container 3 and by a door 11. FIG. 2 shows the washing container 3 in a slight perspective view from the rear. A dishwasher is often designed as a built-in appliance and when fitted is surrounded outside by furniture walls, in which case an external case can be dispensed with entirely or in part. Otherwise it can expediently comprise a case 13 that is formed by outer walls 10 and surrounds the washing container 3. The washing container 3 in this exemplary embodiment comprises a front loading window 6 closable by a front door 11 and a total of five walls 7, specifically a top wall 7a, two side walls 7b, a base wall 7c and a rear wall 7d, at least 20% of at least one of these walls, in particular the rear wall 7d to which reference is made below by way of example, being replaced by two planar lighting elements 8. The planar lighting elements each cover one of two apertures 23 present in the rear wall 7d (shown by dashed lines in FIG. 2), said apertures being separated from one another by a reinforcing member 9. The planar lighting elements 8 in total advantageously replace preferably at least 50%, in particular at least 75%, preferably between 80% and 95%, of the surface area of at least one wall, in particular the rear wall 7d. In the situation in which 95% of the surface area is replaced, the reinforcing member 9 occupies at least some of the remaining 5% of surface area left behind. Each planar lighting element 8 hence forms a large-area illumination element or lighting design unit, which allows each replaced wall surface to light up brightly compared with the other walls such as e.g. 7a, 7b, 7c. For this purpose it can be designed in particular as a backlight that has a preferably homogeneous emission, or as a diffuse light emitter. It is expediently designed as a planar slab, planar panel or planar film so that it is suitable to replace a wall or wall portion. It is also preferably rectangular in shape (viewed from above).

Figure 4:
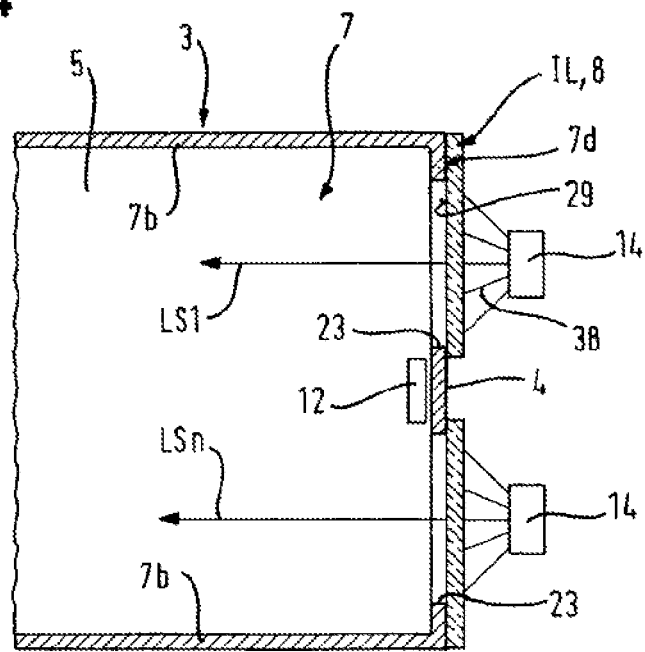
FIG. 4 is a partial section of the washing container of FIG. 2 along line IV-IV.
Figure 5:
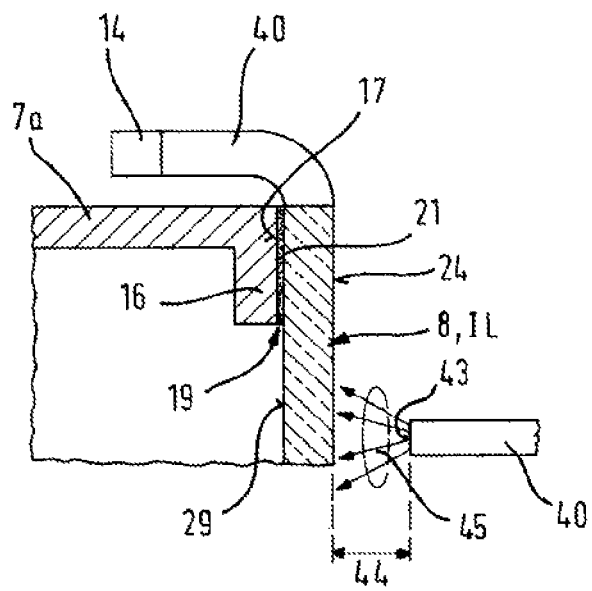
FIG. 5 shows a corner region of the washing container corresponding to the detail V in FIG. 3, in which corner region the light is end-coupled into the planar lighting element by a light waveguide.
Figure 6:
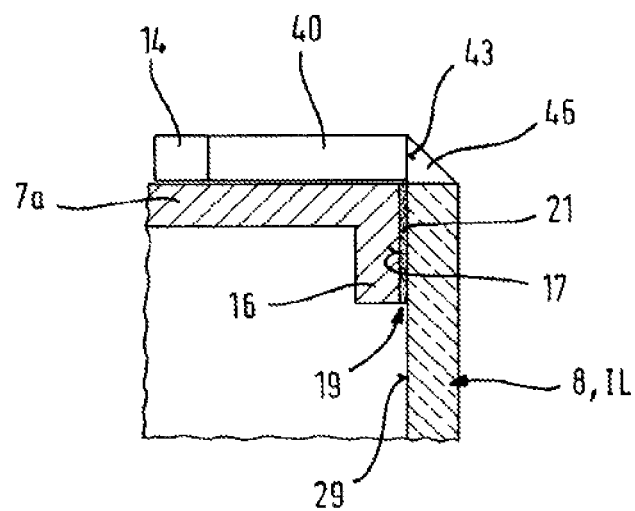
FIG. 6 is a diagram corresponding to FIG. 5 in which the light is coupled into the planar lighting element in a different way.

As shown in FIG. 2, the two planar lighting elements 8 provided side by side along the width of the wall extend almost over the entire height of the washing container 3. Hence the reinforcing member 9 remaining centrally between the two apertures covered or closed by planar lighting elements also runs along the height or in the vertical direction. As was already explained in the introduction, the reinforcing member increases the rigidity of the washing container. It is also used, however, as a mounting member to which components can be fitted, for instance a supply pipe 12 for supplying washing liquid to a spray arm, which pipe runs vertically in the washing chamber 5 and is fixed to the rear wall 7d (FIG. 4). The outer face 4 of the reinforcing member 9 that faces away from the spray arm 5 can likewise be used for fitting components, for instance hoses or pipes (not shown), which may likewise be employed say for supplying washing liquid to a spray arm. FIG. 2 shows a further situation on a side wall 7b in which additionally or independently of the above-described vertical arrangement of the two apertures 23 in the rear wall 7d having the vertical reinforcing member 9 therebetween, the reinforcing member 9' and the apertures 23' run along the depth of the washing container 3, in other words horizontally. The reinforcing member can be used in this case for fixing on its inner face, guidance means, in particular guiding rails, for a basket receptacle (not shown) that can move along the depth. Of course it may also be expedient to provide this horizontal arrangement of two apertures having reinforcing member running horizontally therebetween not in the side wall 7b but in the rear wall 7d of the washing container.

In order that a planar lighting element can illuminate or emit light, it is expediently embodied as a light-guiding light guide. In this embodiment, light rays that are coupled into the planar lighting element e.g. from a light source such as e.g. 14 (see FIGS. 3 and 4) arranged outside the washing container, or are generated in the material of the planar lighting element by excitation using energy, propagate in said element and are coupled out at a multiplicity of coupling-out points, in particular at right angles to their direction of propagation, from the inner wall of the planar lighting element that faces the interior of the washing container into the interior of the washing container. For the purpose of guiding the light, the planar lighting element 8 comprises a flat carrier slab made of a light-guiding material such as e.g. glass, transparent or translucent plastic such as e.g. acrylic glass or a composite of the two materials. It comprises extractors for coupling out light from the light-guiding carrier slab. The light can be coupled out by means of reflecting and/or scattering structures such as e.g. FP (see e.g. FIG. 8) distributed in the light-guide material of the flat carrier slab, by specific fine surface textures on the inner wall surface of the light-guiding carrier slab that faces the washing chamber, and/or by delicate patterns, for instance made from colored particles, applied, in particular printed, on the inner wall surface of the light-guiding carrier slab that faces the washing chamber. The inhomogeneous or heterogeneous distribution of the coupling-out structures achieves a largely uniform illumination of the surface of the planar lighting element because light rays are emitted diffusely in all spatial directions from the light-guiding carrier slab into the interior of the washing chamber.

To summarize, the planar lighting element is designed as a light guide in the sense that light, which is emitted e.g. from one or more point or rod-shaped light sources preferably arranged outside the washing chamber, is distributed as uniformly as possible over the surface of the planar lighting element in order to be able to provide a backlight. This is referred to in particular as light guidance. In this process, light such as e.g. 38 can be injected for example at an end face such as e.g. 39 of the planar lighting element such as e.g. 8 (see FIG. 3). Alternatively or additionally, light can be coupled into the light-guiding material of the planar lighting element 8 via the rear outer wall surface such as e.g. 24 of the flat-slab shaped planar lighting element, i.e. via the surface that faces away from the washing chamber 5 (see FIG. 4). The flat planar lighting element 8 embodied as a slab light guide is preferably made of glass or of a transparent or translucent plastic such as acrylic glass. This contains e.g. extractors, which couple the light out of the light guide into the washing chamber 5. The coupling-out can be implemented by means of scattering and/or reflecting structures distributed in the light-guide material, by specific fine surface textures, and/or by delicate, in particular printed, patterns, for instance in the form of a colored layer or another scattering and/or reflection layer. In order to increase the luminance of the planar lighting element, light from one or more light sources can advantageously be coupled in at a plurality of points of the planar lighting element, for instance at a plurality of end-face points, in particular at two, three or all four end faces of the, for instance rectangular, slab of the planar lighting element. Additionally or independently thereof, light can also be injected into the light-guiding material of the planar lighting element at the rear outer wall surface of the planar lighting element at a plurality of points distributed over the outer wall surface.

The planar lighting element 8 is preferably designed to guide and/or emit light such that one or more light beams 38, 45 (see FIGS. 3, 7 and 5) from at least one light source 14, 40 arranged outside the washing chamber 5 can be coupled into the planar lighting element 8 at at least one coupling-in point 39, 24, one or more coupled-in light beams, such as e.g. LS1' (see FIG. 7) in the planar lighting element 8 can propagate away from their respective coupling-in points 39, 24 in a direction of propagation EFR (see FIG. 7) parallel to the inner wall surface 29 of the planar lighting element 8 that faces the washing chamber 5, and such that of the one or more light beams such as e.g. LS1' propagating in this way, one or more light beams LS1-LSn can be coupled out of the inner wall surface 29 of the planar lighting element 8 that faces the washing chamber 5, in particular at right angles to their direction of propagation EFR, into the washing chamber 5 at one or more coupling-out points AK that differ from the respective coupling-in points 39, 24, although the planar lighting element 8 is designed to be largely opaque viewed from the washing chamber 5.

In particular it can be advantageous if the planar lighting element 8 concerned is designed to appear opalescent when viewed from the washing-chamber side or otherwise providing diffuse illumination.

In contrast, in the dishwasher 1 the other walls such as e.g. 7a, 7b, 7c of a washing container are made in the conventional manner from a non-transparent material, for instance a material such as metal and/or opaque plastic.

In addition, other structures can also be used to form a planar light emitter or a planar lighting element, for instance such structures that are designed as lightboxes. In this case, the light sources are located in a flat tray which internally reflects the light diffusely and allows the light to exit towards the open side, so in this case towards the washing chamber 5. It can also be advantageous if specially shaped reflectors are used for fluorescent lamps as the light source and diffuser lenses for LEDs in order that the light exiting from the lightbox is approximately homogeneous despite the short installation depth for the backlight.

Should the light distributed by the flat-slab shaped light guide or by the lightbox still contain spatial patterning, it can be advantageous if at least one diffuser is used to distribute this light evenly so that it approximates a surface providing absolutely uniform in particular white illumination. A simple solution is e.g. an opalescent panel between light guide or lightbox and the inner wall surface 29 of the planar lighting element 8 that faces the washing chamber 5. In particular, films can also be used, which are a more efficient means of making the light uniform than is possible e.g. using opal glass.

By coupling the light from at least one light source 14, for instance from an incandescent bulb or light emitting diode, into the planar lighting element 8, light inside this element is transmitted and ultimately emitted into the interior of the washing container 3.

A planar lighting element 8 is fixed by its outer edge region 15 for example to the other adjacent walls 7a-7c made of sheet metal for instance, with a range of different options available for this purpose. Quite generally, a planar lighting element 8 is fixed to a fixing flange 16, which encloses an aperture 23 in a wall 7 of the washing container 3. The planar lighting element 8 is fixed to a mounting surface 17 of the fixing flange 16, this mounting surface being formed either by the inner face or outer face of the fixing flange 16. The span of the preferably rectangular aperture 23 viewed in the height direction is only slightly less than the distance between base wall 7c and top wall 7a, and viewed in the width direction is only slightly less than half the distance between the two side walls 7b. The fixing flange 16 can be formed by flanging inwards by 90° towards the aperture 23 concerned in the rear wall 7c the edge regions at the rear end faces of the top wall 7a, the side walls 7b and the base wall 7c. The fixing flange 16, however, can also be the rest of a wall 7 that remains after making an aperture 23 by means of punching. The large-area planar lighting element 8 can be fixed to the fixing flange 16, for example, using an adhesive layer 21, which also ensures that a joint 19 existing between the mounting surface 17 and the planar lighting element 8 is sealed so that washing liquid cannot escape outside between the fixing flange 16 and the planar lighting element 8.

Figure 9:
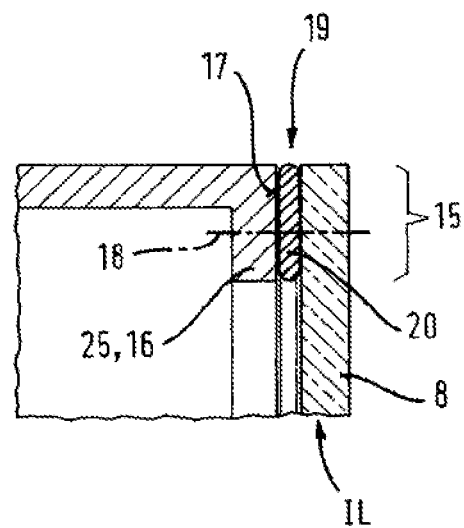
FIG. 9 is a diagram that corresponds to FIG. 5 and illustrates another option for fastening a planar lighting element to a wall of the washing chamber.
Figure 13:
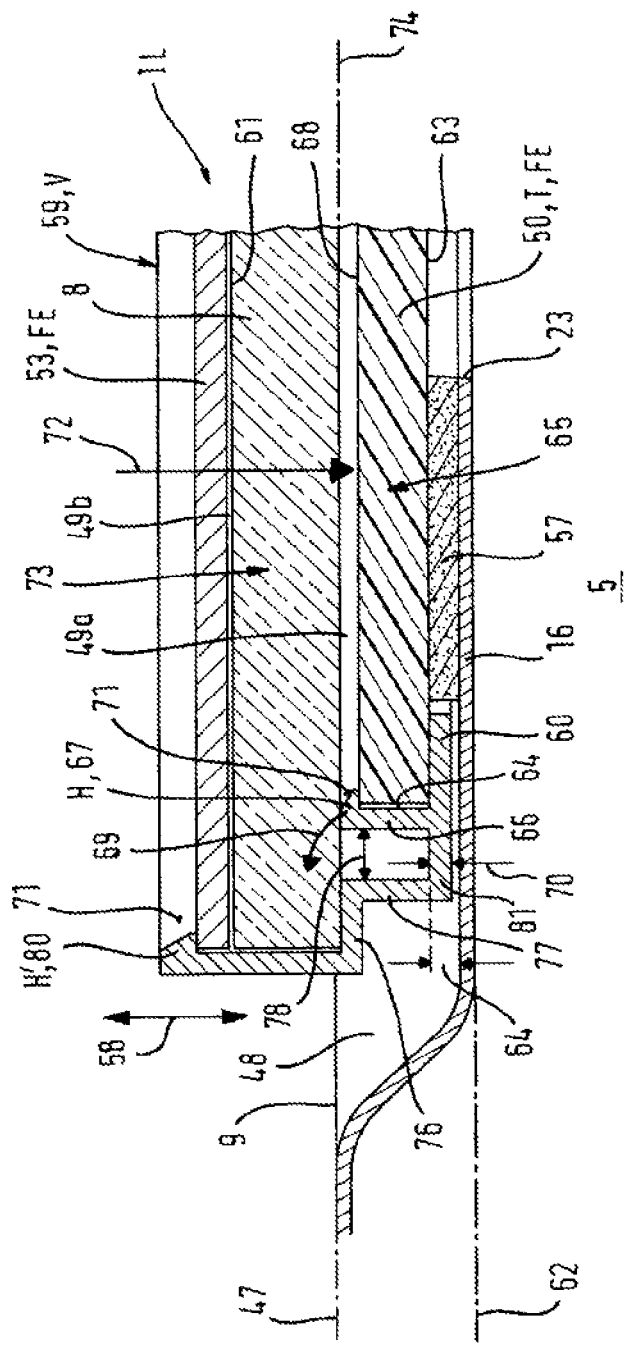
FIG. 13 is a magnified view of the detail XIII in FIG. 11.

FIG. 9 shows an additional or alternative fixing mechanism, namely using a screw connection between the outer edge region 15 of the slab-shaped, in particular rectangular, planar lighting element 8 and the fixing flange 16. The screw connection is indicated by a dashed line 18 in FIG. 9. A gasket 20, for instance made of an elastomer material, is arranged in the joint 19 between the lighting element 8 and the mounting surface 17.

Figure 7:
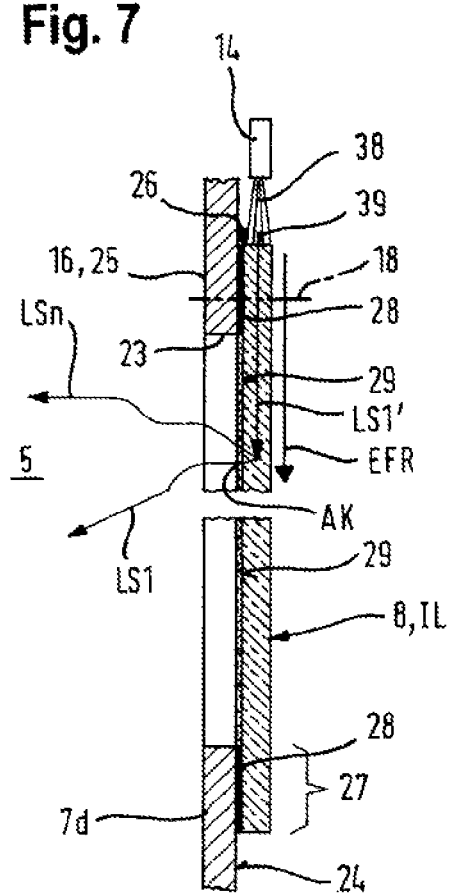
FIG. 7 shows the detail VII from FIG. 4 which illustrates a different way of coupling light into the planar lighting element.

Alternatively, the planar lighting element can be fixed on the inside or, as shown in FIG. 7, preferably on the outside of a wall, such as the rear wall 7d of the washing chamber 5, said planar lighting element 9 being designed such that it overlaps on the outside, i.e. on the side facing away from the washing chamber 5, the edge 25 of the wall 7d, or the fixing flange 16, which surrounds the aperture 23. Again there are various ways of fixing the planar lighting element 8 to the fixing flange 16 of the rear wall 7d, for example using an adhesive layer 28, which also acts as a seal for the joint 26 that exists in the overlap region 27 between the edge 25 and the planar lighting element 8. Additionally or alternatively, a screw connection can again be used for the fixing mechanism, indicated by the dotted-dashed line 18. Instead of an adhesive layer 28, a circumferential gasket corresponding to the gasket 20 in FIG. 9 can also be provided.

Figure 8:
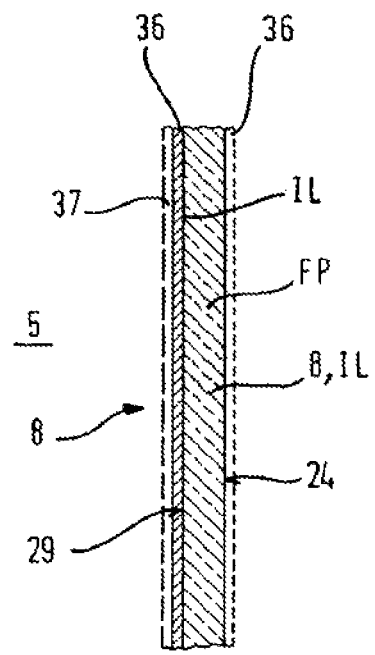
FIG. 8 is a cross-sectional view of a planar lighting element.

Each planar lighting element 8 can be designed in particular such that the light that it emits into the washing chamber has a different color from the coupled-in light from the light source 14. This can be achieved by the material of the planar lighting element 8 containing pigments FP or other scattering and/or reflective particles. It is also possible, however, that in addition or as an alternative thereto a colored layer 36 or other particle layer, for instance in the form of a colored plastics film or the like, is attached, for instance glued, on the inner face or inner wall surface 29 and/or on the outer face or outer wall surface 24 of the planar lighting element 8, 9 (FIG. 8). Luminescent pigments may also be used as pigments if applicable. Another possible embodiment is to design the planar lighting element 8 replacing the wall as a light guide, which in particular together with a luminescent pigment contained in the material of the planar lighting element 8 creates further possible optical designs.

As protection against conditions prevailing in the washing chamber 5, for instance as protection against cleaning chemicals, moisture or high temperatures, the planar lighting element 8 can be provided on the inside i.e. on the side facing the washing chamber 5, with a protective layer 37 made of a material that transmits light from the internal layer of the planar lighting element 8, 9 to the outside towards the washing chamber 5, for example with a coating or a plastics film, which appears largely to block the view, in particular appears opaque, when viewed from outside, in particular from the washing chamber 5.

The protective layer 37 is applied directly to the inner wall of the light-guiding carrier slab of the planar lighting element, which inner wall faces the washing chamber. If a colored layer 36 is present on the inner wall surface 29 that faces the washing chamber, the protective layer is applied to this layer as the topmost finishing layer, as shown in FIG. 8. In the case in which light is coupled in via an end face of the planar lighting element 8, the emission of light into the washing chamber 5 can be increased by providing the planar lighting element 8 on the outside, i.e. on the outer wall surface 24 that faces away from the washing chamber 5, with a layer that reflects light rays towards the washing chamber 5.

Figure 3:
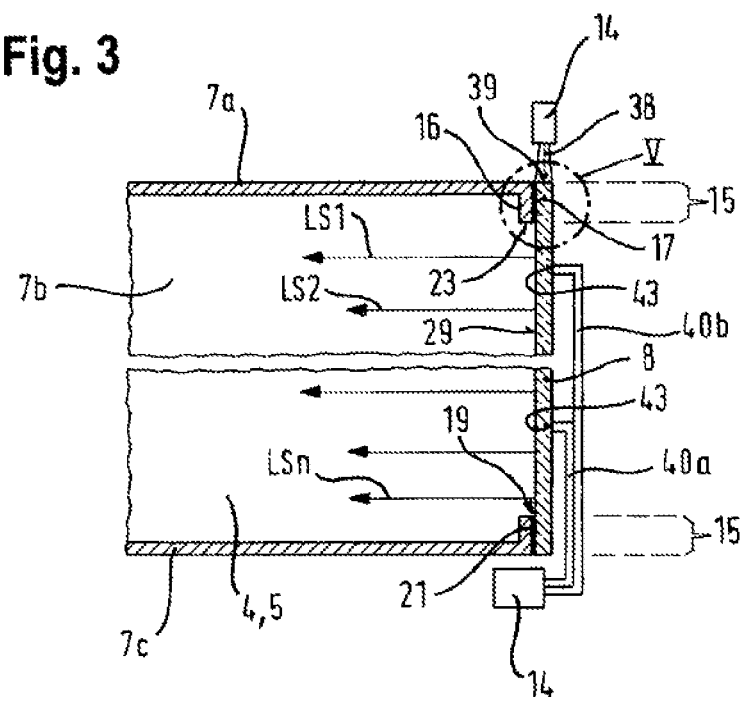
FIG. 3 is a partial section of the washing container of FIG. 2 along line III-III.

In principle, the light can be coupled in such that the light source 14 is arranged at a distance from the planar lighting element 8, i.e. leaving open an air gap. The light source 14 can then be designed in particular such that its light cone 38 is incident fully on the outer wall surface 24 of the planar lighting element 8. In particular, a plurality of light sources 14 can be provided that are spatially offset from one another such that their light cones cover different regions of the outer wall surface 24 of a planar lighting element 8, or, as is the case in FIG. 4, at least one light source is assigned to each planar lighting element 8. An arrangement of a light source 14 is also possible, however, in which its light cone 38 is incident on the end face 39 of the planar lighting element 8 (FIG. 3). If applicable, one or more light sources may also be provided on a plurality of end faces of the planar lighting element 8 for end-coupling in of light.

In particular, an optical transmission element 40 can be provided for coupling in light. This is formed, for example, from one or more light waveguides, for instance optical fibers, and is coupled at one end to the light source 14 and at the other end to an outer wall surface 24 or an end face 39 of the planar lighting element 8. The optical coupling between the transmission element 40 and the planar lighting element 8 can be made without contact if applicable, in particular by connecting an optical unit or imaging unit therebetween. A spacing 44 or an open gap then exists between the light exit surface 43 of the transmission element 40 and the planar lighting element 8. A light cone 45 develops from the light exit surface 43 (see FIG. 5). The optical coupling can also be direct, however, i.e. the light exit surface 43 of the transmission element 40 is mechanically connected to the planar lighting element 8. In each form of optical coupling, an optical deflector 46 or an optical imaging system can be connected in front of the light exit surface 43. In order for light to be incident on a larger surface area of the planar lighting element 8 and/or to increase the luminance of said planar lighting element, it can be expedient to provide a plurality of light sources 14 and/or a plurality of transmission elements 40. FIG. 3 shows the case in which a plurality of transmission elements 40a, 40b are optically coupled to a light source 14, the light exit surfaces 43 of which transmission elements are arranged at different positions on the outer wall surface 24 of the planar lighting element 8.

FIG. 10 shows a detail of the rear wall 7d of a washing container 3. This wall is preferably integrally formed with the, for instance deep-drawn, washing container 3 (not shown in FIG. 10). In the rear wall 7d are two window-like apertures 23, which are substantially rectangular and extend practically over the full height of the washing container 3 or of the rear wall 7d in particular substantially vertically. The apertures 23, which are preferably made by a punching process, are enclosed by an edge of the rear wall 7d, which forms a fixing flange 16 in particular for fixing a planar lighting element 8. The apertures 23 are separated from one another by a reinforcing member 9, which also like the apertures 23 extends in the vertical direction of the washing container 3. The reduced mechanical rigidity of the washing container 3 resulting from replacing most of the rear wall 7d with a lighting region, is increased not only by the fact that the lighting region is realized by two apertures 23 separated from one another by a reinforcing member, and by planar lighting elements 8 covering or closing said apertures, but also further increased by the fixing flange 16 being offset in the transverse direction 58 to the wall from the plane 47 spanned by the reinforcing member. This gives the reinforcing member 9 the shape of a C-section viewed in cross-section, which in particular considerably increases its resistance to buckling and its torsional stiffness. By virtue of said offset, the other wall regions that enclose the apertures are in the form of angle sections or have a stepped shape, which further increases the mechanical rigidity of the rear wall. The offset of the fixing flange 16 can be produced easily by stamping a recess 48 in the rear wall 7d (or another wall of the washing container) from its inside or outside, and then punching out a region of the recess 48 that corresponds to the aperture 23. The fixing flange 16 is preferably offset towards the washing chamber 5, i.e. the recess 48 has been pressed in from the outside of the rear wall 7d towards the washing chamber. A planar lighting element 8 can in this case be mounted on the outer side of the fixing flange 16 which faces away from the washing chamber 5, where some of the thickness of the planar lighting element is accommodated by the recess or trough 48, i.e. only some or none of the planar lighting element 8 protrudes beyond the plane 47 spanned by the reinforcing member. This is advantageous, for instance, if there is little space on the outside of the washing container.

A planar lighting element 8 can be designed in particular such that it performs further functions in addition to its lighting function, for example it increases the stiffness and mechanical strength of the wall concerned or is resistant to the conditions prevailing in the washing chamber during the cleaning operation. The disadvantage here is that such additional functions are often not available in standard commercial planar lighting elements and therefore special designs are needed. Therefore to avoid this, requirements beyond the lighting function are preferably achieved using at least one transparent, translucent or reflective planar element FE arranged on one side of the planar lighting element 8 and covering the aperture. The planar element FE, however, is not connected to the corresponding planar lighting element over a large area in the manner of a lamination, for instance. Instead, the planar lighting element and the particular planar element FE associated therewith are separated from one another by an air gap 49a, 49b. The gap width of the air gap 49a, 49b is greater than 1 µm. This prevents the occurrence of disturbing light/dark zones, known as Newton rings, caused by interference phenomena. In addition, the air gap 49a, 49b can also be used for thermal insulation. Air present in the air gap 49a, 49b can act as an insulator. If the gap width of the air gap 49a, 49b is limited to 2 cm maximum, this can prevent air convection developing which would reduce the insulating effect of the air cushion in the air gap.

In the exemplary embodiment shown in FIGS. 11 to 14, each planar lighting element 8 is assigned on its washing-chamber side a planar element FE in the form of a front panel 50 and/or on its side facing away from the washing chamber a reflective planar element FE in the form of a reflector film 53, in each case leaving open an air gap 49a, 49b. In this case, for example, the gap width of the air gap 49a equals 0.5 mm and the gap width of the air gap 49b equals 0.1 mm. The front panel 50 has a thickness of 2 mm for instance and is made of a plastic that is resistant to the chemicals used in the washing chamber during operation, for example is made of PMMA or polyamide. As FIG. 14 shows, the reflector film 53 preferably has a multilayer construction. It comprises a base film 52 made of transparent or translucent material e.g. made of a polyacrylate, the side of which base film that faces away from the washing chamber 5 being provided with a reflector film 54 whose reflective property originates from e.g. coating with white paint, for example $TiO_2$, or from metal vapor deposition. The light is coupled into the planar lighting element 8 via one of its end faces 84. In this case, the relevant light source 14, preferably an LED strip 55 positioned on the end face of the planar lighting element 8, is designed and/or oriented such that the light it emits is not only end-coupled into the planar lighting element 8 but is also coupled simultaneously via an end face 85 of the reflector film 53 into said film, i.e. mainly into the base film 52. In contrast with end-coupling of light solely into the planar lighting element 8, in which situation only the light exiting via the side 61 of the planar lighting element 8 that faces away from the washing chamber 5 is reflected back towards the washing chamber 5 by the reflector film 53, it has been found surprisingly that a high light output and very uniform illumination at a high light intensity can be achieved by the proposed embodiment. In this regard it is advantageous if the end faces of the reflector film 53 that are not exposed to the light from the light source are provided with a strip of reflective material such as a reflector film 54 of the aforementioned type. This ensures that practically all the light coupled in via the end face of the reflector film 53 is available to illuminate the planar lighting element 8 or in other words to illuminate the washing chamber 5.

In another preferred embodiment of the reflector film 53, the side of said film that faces the washing chamber 5 is provided with at least one diffuser layer 56, i.e. a light-scattering film or pane. This further enhances the effect described above of uniform illumination of the washing chamber 5.

There are various possible options for fixing to the fixing flange 16 a planar lighting element 8 and/or a planar element FE, such as a front panel 50, associated with the planar lighting element and covering the aperture. The preferred fixing mechanism, however, is one that accommodates a relative movement between the planar lighting element 8 and/or the planar element and the fixing flange 16, which movement is caused by different thermal expansions and runs parallel to the plane 62 spanned by the fixing flange 16. In a particularly preferred embodiment variant, this is achieved by adhesively bonding the planar lighting element 8 and/or the planar element FE, in particular the abovementioned front panel 50, to the fixing flange 16 with the interposition of an elastic corrective layer 57 that absorbs shear forces caused by said relative movement. For the adhesive bond, the corrective layer 57, which is preferably embodied in the form of an O-ring, can be or is provided on its side that faces the fixing flange 16 and on its side that faces away from fixing flange 16 with adhesive, for example an acrylic glue, so is in the form of a double-sided adhesive tape for instance. The shear-force absorbing action of the corrective layer 57 is particularly well pronounced when it is formed at least in part, preferably entirely, from a plastics foam, in particular a polyolefin foam, because the cellular internal structure of the foam allows particularly high absorption of shear forces. A certain minimum thickness of the corrective layer of 0.2 mm to 0.4 mm is necessary, however. The maximum thickness of the corrective layer should also expediently not exceed 2 mm, preferably 1 mm.

As already mentioned above, it is advantageous to provide a planar lighting element 8 with at least one planar element FE covering the aperture concerned, with particular reference to the front panel 50 already mentioned, which is preferably mounted on the side of the fixing flange 16 that faces away from the washing chamber 5. The front panel 50 can be produced from a relatively rigid material so that it can contribute to the rigidity of a wall 7, at least part of which has been replaced by a planar lighting element 8. In particular it is advantageous if additionally or alternatively a material that is resistant to the chemicals used in the washing chamber during operation of the dishwasher is selected for the front panel 50 as a whole or at least for its surface layer that faces the washing chamber 5. The planar lighting element 8 itself can then be chosen solely on the basis of optical or photometric considerations without regard to mechanical or chemical properties or requirements.

Regarding the problem explained above of a relative movement, caused by different thermal expansion, between the fixing flange 16 and a planar lighting element 8 and/or planar element FE connected to said flange, it is particularly advantageous if said elements form a carrier T on which is fixed a planar lighting element 8 and/or a planar element FE, which does not primarily serve illumination purposes, without being connected to the wall such as e.g. 7d or to the washing container 3. By virtue of there being no mechanical connection to the washing container 3, problems relating to a different level of thermal expansion at the connecting point cannot arise. In addition, especially for washing containers made of steel and for the plastics material of a planar lighting element 8 or of another planar element FE, i.e. the carrier T, there is a marked difference in the thermal expansion of said materials, with the result that problems arising therefrom (without countermeasures) and which weaken the connection concerned in the long term are particularly pronounced. On the other hand, if an element made of plastics material is fixed to the carrier T, owing to the similar materials, at most only small differences in the thermal expansion arise, but which would not be a problem because of there being no connection to the washing container.

The fixing together of a planar lighting element 8 and at least one separate planar element FE, in particular the fixing of a planar lighting element 8 and/or a planar element FE to the carrier T, for example to the aforementioned front panel 50, is achieved by means of a connecting element V, which is connected to the carrier T preferably by a form-fit operating in the transverse direction 58 to the wall 7*d*. Such a form of connection is advantageous particularly as regards assembly, because it can be designed as a snap-fit connection, for example, which requires merely a simple linear joining motion during assembly. In addition, a form-fit connection allows a defined air gap 49*a*, 49*b* to be maintained between said elements, in particular in a manner that is easy for assembly. Other elements such as a planar lighting element 8 or a planar element FE, for instance a reflector film 53, are also preferably fixed by means of a form-fit operating in the transverse direction 58 to the wall, said form-fit being achieved in particular by one or more snap-fit connections. In this case, the planar lighting elements 8 and/or planar elements FE can be connected by a simple linear joining motion to the connecting element V, which for example is already fixed to the carrier T.

The connecting element V is preferably a frame 59, which encloses not only the carrier T. i.e. the front panel 50 for instance, but also other planar elements, preferably a planar lighting element 8 and/or one or more planar elements FE, holding said elements against one another by a form-fit operating in the transverse direction 58 to the wall. The frame 59 uses clasp elements 60 to engage behind the side 63 of the carrier T or of the front panel 50 that faces the washing chamber 5. The clasp elements 60 are bracket-shaped wall segments that extend parallel to the plane spanned by the frame 59 or parallel to the plane 47 spanned by the reinforcing member 9. The thickness of the correction layer 57 is chosen such that a gap 64 remains between the fixing flange 16 and the carrier T or the front panel 50, the gap width of which measured in the transverse direction 58 to the wall is greater than the thickness 70 of the clasp elements 60. This ensures that the correction layer 57, which is elastic in the transverse direction 58 to the wall, during assembly can be compressed to a certain extent in the transverse direction 58 to the wall, for the purpose of a sufficient adhesive bond between carrier T and fixing flange 16, without the frame 59 coming into contact with the fixing flange 16 or preventing the correction layer 57 from pressing against the fixing flange 16.

The frame 59 comprises a first receptacle 65 in which the carrier T or the front panel 50 is fully accommodated. The receptacle is bounded laterally by a wall 66, which extends away from the clasp elements 60 in the transverse direction 58 to the wall. At least a portion of the free ends of the wall 66 that face away from the washing chamber 5 are formed as clasp elements H, which engage behind the carrier T on its side 68 that faces away from the washing chamber 5. The clasp elements H are preferably in the form of hook strips 67 distributed around the perimeter of the frame 59. They form snap-fit connecting elements, which by virtue of an inclined insertion surface 71 that faces away from the washing chamber 5, are moved outwards (arrow 69 in FIG. 13) elastically when a carrier T is inserted in the frame 59 in the insertion direction 72, and at the end of the joining motion spring back into their initial position by elastic restoring forces, in which position they engage behind the carrier T. Any relative movement between the carrier T and the frame 59 as a result of different thermal expansion parallel to the plane 62 spanned by the fixing flange 16 is facilitated by a gap 64 between the wall 66 and at least one end face of the carrier T.

The frame 59 comprises a further receptacle 73, which is used to accommodate the planar lighting element 8 preferably fully. The side of the clasp element H that faces away from the washing chamber 5 defines a supporting plane 74 on which the planar lighting element 8 rests. The frame 59 is formed substantially by a wall 75 having a step 76, where the surface of the step 76 that faces away from the washing chamber 5 lies in the supporting plane 74. In the assembled state, the planar lighting element 8 is therefore supported on the clasp elements H and on the step 76. The dimension of the clasp elements H in the transverse direction 58 to the wall defines the gap width of the gap 49*a* that exists between the planar lighting element 8 and the carrier T or front panel 50. A wall segment 77 of the wall 75 that extends from the step 76 towards the washing chamber 5 surrounds the wall 66 comprising the clasp elements H at a lateral distance 78. On the free end of the wall segment 77 that faces the washing chamber 5 is integrally formed a wall 81 running parallel to the supporting plane 74, from which wall the wall 66 extends towards the receptacle 73.

On the free ends of the stepped wall 75 that point away from the washing chamber 5 are integrally formed clasp elements H', which engage at least indirectly behind the side 79 of the planar lighting element 8 that faces away from the washing chamber 5. When the clasp elements H', which are preferably in the form of hook strips 80 distributed around the perimeter of the frame 59, engage directly, they impinge directly on the side 61 of the planar lighting element that faces away from the washing chamber 5. In the exemplary embodiment shown in FIGS. 11 to 13, a planar element FE, in particular the aforementioned reflector film 53, is arranged with the air gap 49*b* left open. The air gap 49*b* is defined by edge-positioned spacers (not shown). The clasp elements H' engage behind the reflector film 53 and hence rest thereon. The hook strips 80 are formed on their side that faces away from the washing chamber 5 likewise with an inclined insertion surface 71 that makes it easier to insert the planar lighting element 8, possibly provided with a reflector film 53, in the joining direction 72. The clasp elements H' or the hook strips 80 therefore act like snap-fit connecting elements or are designed as such.

A light source 14 in the form of an LED strip 55 is assigned to the planar lighting element 8 and is arranged in a receptacle 83 that opens into the washing chamber 5. The light source 14 or the LED strip 55 is dimensioned and arranged such that light it emits is coupled both into the end face 84 of the planar lighting element 8 that faces said light source or LED strip, and into the end face 85 of the reflector film 53 that faces said light source or LED strip, which is indicated by the arrows 86 in FIG. 12.

FIG. 15 shows a perspective schematic diagram of another advantageous exemplary embodiment of an illuminated wall which bounds the washing chamber, in particular the rear wall of the washing container of the dishwasher of FIG. 1, in this case viewed from outside, with the individual components of a single lighting panel of the wall being depicted additionally in an exploded view by way of example. In the rear wall 7*d*, are provided side by side two vertical rows each of three apertures 23 arranged one above the other, i.e. there are a total of six apertures in the rear wall 7*d*. Each aperture 23 is rectangular in shape. Vertical and horizontal reinforcing members of the preferably metallic wall 7*d* are left standing between the individual apertures 23 to ensure sufficient rigidity of the wall despite the apertures. Each aperture is provided with an illumination element IL from the outside, i.e. on the side of the wall 7*d* that faces away from the washing chamber 5. The illumination element IL comprises, viewed from the inside of the washing chamber 5 outwards, the cover panel or front panel 50 that is resistant to washing solutions, i.e. in general terms is resistant to the particular chemicals used during washing. This panel is glued to the rear side i.e. the outside of the wall 7*d* by a frame-shaped adhesive mask 572. The adhesive mask here rests on a fixing flange 16 of the wall 7*d* that runs around the aperture 23. This flange is preferably formed as a trough-like depression towards the washing chamber and accommodates the front panel 50, in particular in a largely flush fit. The front panel 50 is thus fixed by the adhesive mask 572 to the edge of the wall 7*d* enclosing the aperture 23. It is made of a plastics material that preferably transmits light, but in particular is not see-through, for instance a material such as polyamide. The adhesive mask 572 at the same time forms a leak-proof seal between the front panel 50 and the edge zone 16 of the rear wall 7*d* around the aperture 23. In addition, it acts as the correction layer for absorbing shear forces that may arise from different thermal expansions of the rear wall 7*d* and the front panel 50. Such different thermal expansions can be caused by different materials for the rear wall 7*d* such as e.g. steel, and for the front panel 50 such as e.g. plastics, because these materials have different coefficients of thermal expansion from each other.

The illumination element IL comprises behind the front panel 50 (viewed from the inside outwards) the planar lighting element or lighting panel 8. The planar lighting element 8 is held at the front in a cover frame acting as a retaining element HE. The retaining element HE has a closed rear wall RE, which is formed as a planar reflector element. For instance, the rear wall of the retaining element HE can be provided on its side facing the lighting panel 8 with a white colored layer or a white coating as a light-reflecting background. The cover frame HE also accommodates a lighting strip such as e.g. LED strip LL or another longitudinal light source such that light along the longitudinal extension of an end face can be coupled into this end face, in particular into the top end face of the lighting panel 8, which in this exemplary embodiment is shaped as a rectangle. The lighting panel 8 is expediently held in the cover frame HE such that between said frame and the light-reflecting rear wall RE there is an air gap of a defined gap width in order to prevent unwanted lighting phenomena such as Newton rings, and to ensure a largely homogeneous, uniform illumination over the entire surface of the lighting panel 8. Hence at every position in the lighting panel 8 the panel preferably illuminates with approximately the same light intensity.

Here in the exemplary embodiment of FIG. 15, the cover frame HE together with the lighting panel 8 that it is holding is advantageously fixed by a mechanical fastening to the outside of the rear wall 7*d*, offset at a defined gap, viewed from the inside outwards, behind the front panel 50 which covers or closes the aperture 23 in a leak-proof seal by means of the adhesive mask 572. In this exemplary embodiment, for the purpose of mechanical fastening, a preferably rectangular blanking frame BR is provided on the inside, i.e. the side of the rear wall 7*d* facing the washing chamber 5, which is fixed to the wall edge around the, in this case rectangular, aperture 23 on the washing chamber side by means of an adhesive mask 571, which is rectangular in this case. The blanking frame BR has on its rear side a plurality of pins, pegs or studs SI, which are fed through corresponding holes or openings BO in the rear wall 7*d*, in the front panel 50, in the cover frame HE and in a compression frame APR that may be present, and are held against the outside of the cover frame HE by circlips SS. The cover frame HE together with the lighting panel 8 that it is holding is thus fixed to the outside of the rear wall 7*d* at a defined gap behind the front panel 50 by a mechanical fastening.

If applicable, blanking frame BR provided inside the washing chamber and the adhesive mask 571 provided to fix said frame can be dispensed with. In place of these, pins, pegs or studs SI can be e.g. welded or otherwise permanently fixed to the outside of the wall 7*d* at the edge zone 16 of the rear wall around the aperture 23. The components such as e.g. 50, HE of the illumination element IL can then be mechanically fixed as explained above using a retaining mechanism.

The combination of adhesive bonding and additional mechanical fastening of the illumination element IL to the illumination wall such as e.g. 7*d* means that the resultant assembly largely has a leak-proof design and is immune to impacts from inside and out. Mechanically fastening the illumination element to the wall relieves the sealing adhesive bond between the front panel 50 and the supporting zone, in particular the fixing flange 16 that surrounds the aperture 23 concerned.

In a variation of these two aforesaid advantageous constructions, the cover frame HE can be designed in particular such that it receives and holds also the suds-resistant front panel 50 at a defined gap in front of the lighting panel 8, i.e. in front of its side that faces the washing chamber. In this case, the adhesive bond 572 is provided between the supporting zone 16 and the outer edge of the front panel 50 that faces the washing chamber, and the illumination element IL is additionally fixed to the outside of the wall by a suitable mechanical fastening.

This complete assembly of the illumination element IL, which according to an advantageous embodiment variant comprises (viewed from the inside outwards) the cover frame HE, the front panel 50, the lighting panel 8 spaced by a defined gap behind said front panel, and the planar reflector element RE spaced by a defined gap behind said lighting panel, can, according to an advantageous alternative be fixed, if applicable, merely by the adhesive mask 572 to the rear fixing edge encircling the aperture 23, in particular to the fixing flange 16 of the rear wall 7*d* of the washing chamber. Thus this variant dispenses with an additional mechanical fastening.

To summarize, it can thus be expedient if that wall bounding the washing chamber, which becomes wet during washing operation, that is intended for illumination comprises a multiplicity of illumination elements, which cover or close the associated apertures in the wall. The apertures remain separated from one another by remaining members of the wall material such as e.g. sheet steel. Thus to sum up, an illumination structure is obtained that results in lighting or illumination of most of the total surface area of the wall and yet is sufficiently rigid for practical operation of the dishwasher. Thus in particular the rear wall of the washing container can be illuminated over a large area, in particular an area of between 50% and 95% of its total surface area.

The invention claimed is:

1. A dishwasher, comprising:
   a washing container comprising a plurality of walls and enclosing a washing chamber, at least one of the walls of the washing container having a plurality of apertures, the at least one of the walls defining an external wall surface of the washing container facing away from the washing chamber;
   at least one artificial light source which produces artificial light;
   a plurality of planar lighting elements configured to at least one of guide or emit the artificial light, with each one of the plurality of planar lighting elements respectively covering a corresponding one of the plurality of apertures,
      wherein each one of the plurality of planar lighting elements has an internal surface that faces and is exposed to an inside of the washing chamber, and
      wherein each one of the plurality of planar lighting elements has an external surface that faces away from the washing chamber and is visible from an exterior of the washing container; and
   at least one reinforcing member separating the plurality of apertures from one another, the plurality of planar lighting elements being sized to occupy at least 20% of the external wall surface of the at least one of the walls of the washing container.

2. The dishwasher of claim 1, wherein the at least one of the walls is a rear wall of the washing container.

3. The dishwasher of claim 1, wherein a corresponding one of the plurality of planar lighting elements is fixed indirectly or directly to an edge of the at least one of the walls, and wherein the edge encloses a corresponding one of the plurality of apertures and forms a fixing flange.

4. The dishwasher of claim 3, wherein the corresponding one of the plurality of planar lighting elements is fixed by an adhesive bond and/or mechanical fastening to the edge of the at least one of the walls.

5. The dishwasher of claim 1, wherein the plurality of planar lighting elements is sized to occupy at least 50% of the external wall surface of the at least one of the walls of the washing container.

6. The dishwasher of claim 1, wherein the plurality of planar lighting elements is sized to occupy at least 75% of the external wall surface of the at least one of the walls of the washing container.

7. The dishwasher of claim 1, wherein the plurality of planar lighting elements is sized to occupy between 80% and 95% of the external wall surface of the at least one of the walls of the washing container.

8. The dishwasher of claim 1, wherein each one of the plurality of planar lighting elements is formed by a slab-shaped or panel-like element.

9. The dishwasher of claim 1, wherein each one of the plurality of planar lighting elements is configured to have a flat surface at least on the internal surface that faces the washing chamber.

10. The dishwasher of claim 9, wherein the flat surface is smooth as compared to the external surface that faces away from the washing chamber.

11. The dishwasher of claim 1, wherein each one of the plurality of planar lighting elements is configured as a backlight.

12. The dishwasher of claim 11, wherein light is uniformly distributed over each one of the plurality of planar lighting elements.

13. The dishwasher of claim 1, wherein each one of the plurality of planar lighting elements is configured to guide and/or emit light, such that at least one light beam from the at least one artificial light source that is arranged outside the washing chamber is coupleable into a corresponding one of the plurality of planar lighting elements at at least one coupling-in point, at least one of the coupled-in light beams in the corresponding one of the plurality of planar lighting elements is able to propagate away from its coupling-in point in a direction of propagation parallel to the internal surface of the corresponding one of the plurality of planar lighting elements that faces the washing chamber, wherein of the at least one light beam propagating in this way, at least one light beam is coupleable out of the internal surface of the corresponding one of the plurality of planar lighting elements into the washing chamber at a coupling-out point that differs from the coupling-in point, with the corresponding one of the plurality of planar lighting elements being configured to be opaque when viewed from the washing chamber.

14. The dishwasher of claim 13, wherein the at least one light beam is coupled out of the internal surface of the corresponding one of the plurality of planar lighting elements at a right angle to its direction of propagation.

* * * * *